US008607461B2

(12) United States Patent
Miyahara et al.

(10) Patent No.: US 8,607,461 B2
(45) Date of Patent: Dec. 17, 2013

(54) BUSH CUTTER (75) Inventors: Kazuyoshi Miyahara, Wako (JP); Hiroaki Uchitani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 12/903,812

(22) Filed: Oct. 13, 2010

(65) Prior Publication Data
US 2011/0083328 A1    Apr. 14, 2011

(30) Foreign Application Priority Data

Oct. 14, 2009 (JP) ................................ P2009-237431

(51) Int. Cl.
*B26B 7/00* (2006.01)

(52) U.S. Cl.
USPC .................. 30/276; 30/279; 30/329

(58) Field of Classification Search
USPC ............. 30/279, 329, 342, 276, 347; 56/12.7; 83/698.41, 698.51, 698.61
See application file for complete search history.

(56) References Cited

U.S. PATENT DOCUMENTS

| 5,103,561 | A  | * | 4/1992  | Harada et al. | 30/276 |
| 5,906,051 | A  | * | 5/1999  | Nannen         | 30/276 |
| 6,666,009 | B1 | * | 12/2003 | Brandon        | 56/12.7 |
| 6,769,185 | B2 | * | 8/2004  | Kottke et al.  | 30/276 |
| 6,971,223 | B2 | * | 12/2005 | Scott et al.   | 56/12.7 |
| 7,467,470 | B2 | * | 12/2008 | Robison        | 30/276 |
| 2005/0223566 | A1 | * | 10/2005 | Sullivan     | 30/276 |

FOREIGN PATENT DOCUMENTS

JP       2005-237265 A     9/2005

* cited by examiner

*Primary Examiner* — Omar Flores Sanchez
(74) *Attorney, Agent, or Firm* — Arent Fox LLP (57) ABSTRACT

Driving power is transmitted to an output shaft, via driving and driven bevel gears, to a cutter blade. A gearbox supports the output shaft via first and second bearings. The second bearing is engaged by an engaging member to be prevented from axial movement, toward the blade, relative to the gearbox and supports the output shaft near the cutter blade. The output shaft is connected to the driven bevel gear such that it is prevented from rotation relative to the driven bevel gear but allowed to move axially. When the engaged state, by the engaging member, of the second bearing is canceled, the shaft is allowed to axially move toward the cutter blade until the shaft becomes rotatable relative to the driven bevel gear, at the same time of which a retaining stopper prevents the shaft from further axial movement.

3 Claims, 5 Drawing Sheets

BUSH CUTTER

FIELD OF THE INVENTION

The present invention relates to bush cutters and, more particularly, to a technique for preventing an output shaft, having a cutter blade provided thereon, from being undesirably detached from a gearbox.

BACKGROUND OF THE INVENTION

Generally, in the bush cutters, a drive shaft passed through a pipe-shaped operating rod is driven by a drive source, provided on a rear end portion of the operating rod, to rotate a cutter blade provided on a front end portion of the operating rod. Among the conventionally-known types of bush cutters are the shoulder-hanging type and backpack type. In the case of the shoulder-hanging type, a human operator slings the bush cutter over one of the shoulders in such a manner that the operating rod extends from near the operator's waist obliquely forward and downward, and cuts grass by swinging the operating rod up and down, back and forth and left and right while grabbing an operating hand provided on an intermediate portion of the operating rod. One example of such a shoulder-hanging type bush cutter is disclosed in Japanese Patent Application Laid-open Publication No. 2005-237265 (hereinafter referred to as "the patent literature").

The bush cutter disclosed in the patent literature, a gearbox is provided on the front end portion of the pipe-shaped operating rod, and a bevel gear unit is provided within the gearbox. Driving power of the drive source is transmitted from a drive shaft to an output shaft via driving bevel gear and driven gear, so that the cutter blade provided on the front end portion of the output shaft can be rotated by the driving power. The gearbox has one end portion opening toward the cutter blade, and the output shaft and bevel gear unit are built into the gearbox through this open end portion. The output shaft is supported in the gearbox via a pair of upper and lower bearings, and the cutter blade is attached, via a fastening member, to a lower end portion of the output shaft projecting downward through the one end portion. The lower bearing adjacent to the cutter blade is fastened to the gearbox via a retaining ring. A labyrinth mechanism is provided between the surface of the open end portion and the fastening member, and this labyrinth mechanism serves to prevent foreign matters, such as cut grass and pebbles, from entering the gearbox during bush cutting work using the bush cutter.

The labyrinth mechanism comprises an extremely narrow maze-like gap. If the bush cutter is used for a long time, foreign matters would undesirably bite into the labyrinth mechanism and wind around the surface of the open end portion, so that the surface of the open end portion tends to be worn. As the wear of the surface of the open end portion progresses, the retaining ring fastening the lower bearing, located adjacent to the cutter blade, to the gearbox may be undesirably detached downward from the gearbox. As a consequence, the lower bearing and the output shaft may be detached downward from the gearbox.

To avoid such unwanted detachment of the lower bearing and output shaft, an extra or backup retaining ring is attached to an upper end portion of the output shaft remote from the one end portion having the cutter blade provided thereon. The backup retaining ring is held in contact with the upper surface of an inner race of the upper bearing, and thus, even when the above-mentioned retaining ring fastening the lower bearing to the gear box (i.e., main retaining ring) has been detached from the gearbox, the backup retaining ring can still retain the output shaft. Because the output shaft is prevented from moving downward by the backup retaining ring, it will not be detached downward from the gearbox. Because the driving power of the drive source can continue to be transmitted from the bevel gear unit to the output shaft even after the detachment of the main retaining ring, the cutter blade can continue to rotate. However, to permit timely and prompt maintenance and checkup of the bush cutter, it is desirable that a human operator be allowed to recognize a state in which the main retaining ring fastening the lower bearing to the gearbox is detached from the gearbox.

SUMMARY OF THE INVENTION

In view of the foregoing prior art problems, it is an object of the present invention to provide a technique which can not only prevent an output shaft of a bush cutter from being undesirably detached from a gearbox but also permits timely and prompt maintenance and checkup of the bush cutter.

In order to accomplish the above-mentioned object, the present invention provides an improved bush cutter in which driving power of a drive source is transmitted from a drive shaft to an output shaft, via driving and driven bevel gears, to rotate a cutter blade provided on one end section of the output shaft, which comprises: a gearbox supporting therein the output shaft via first and second bearings, the driven bevel gear being accommodated in the gearbox in such a manner that the driven bevel gear is not movable relative to the gearbox in an axial direction of the output shaft; the second bearing engaged by an engaging member, fastened to the gearbox, in such a manner that the second bearing is not axially movable toward the cutter blade relative to the gearbox, the second bearing supporting a portion of the output shaft located near the cutter blade; the output shaft connected to the driven bevel gear within the gearbox in such a manner that the output shaft is not rotatable relative to the driven bevel gear but axially movable relative to the driven bevel gear, and that, when an engaged state, by the engaging member, of the second bearing is canceled, the output shaft is axially movable with the second bearing toward the cutter blade; and a retaining stopper provided on another end section of the output shaft, opposite from the one end section having the cutter blade provided thereon, within the gearbox, wherein, when the engaged state, by the engaging member, of the second bearing is canceled, the output shaft is allowed to axially move toward the cutter blade until the output shaft becomes rotatable relative to the driven bevel gear, the retaining stopper preventing the output shaft from further axially moving toward the cutter blade after the output shaft becomes rotatable relative to the driven bevel gear.

According to the present invention, when the engaged state, by the engaging member, of the second bearing has been canceled due to some cause, the output shaft is allowed to axially move a predetermined distance toward the cutter blade until the output shaft becomes rotatable relative to the driven bevel gear. Further, after the output shaft becomes rotatable relative to the driven bevel gear in the aforementioned manner, the retaining stopper prevents the output shaft from axially moving toward the cutter blade beyond the predetermined distance. In this way, the output shaft can be reliably prevented from being detached from the gearbox. In this state, the driven bevel gear, meshing with the driving bevel gear, only rotates idly and thus does not transmit the driving power to the output shaft, so that the cutter blade will promptly stop rotating due to resistance of grass etc. Thus, a human operator can promptly recognize that the cutter blade has stopped rotating, as a result of which maintenance and checkup of the bush cutter can be performed timely and promptly.

Preferably, the first bearing is not movable relative to the gearbox in the axial direction and supports the other end section of the output shaft opposite from the one end section having the cutter blade provided thereon. The other end section of the output shaft axially projects beyond the first bearing in a direction opposite from the cutter blade, and the retaining stopper is provided on a projecting distal end portion of the other end section. Further, rotation of the output shaft relative to the driven bevel gear is allowed when the retaining stopper is brought into contact with the first bearing in response to the output shaft axially moving toward the cutter blade. Thus, the present invention can reliably prevent the output shaft from moving toward the cutter blade beyond the predetermined distance, with the simple construction where the other end section of the output shaft projects beyond the first bearing in the direction opposite or away from the cutter blade and the retaining stopper is provided on the distal end portion of the other end section Preferably, the driven bevel gear is spline-coupled to the output shaft, and a distance between a lower end surface of the retaining stopper and an upper end surface of the first bearing is greater than an axial length over which the driven bevel gear is spline-coupled to the output shaft. The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
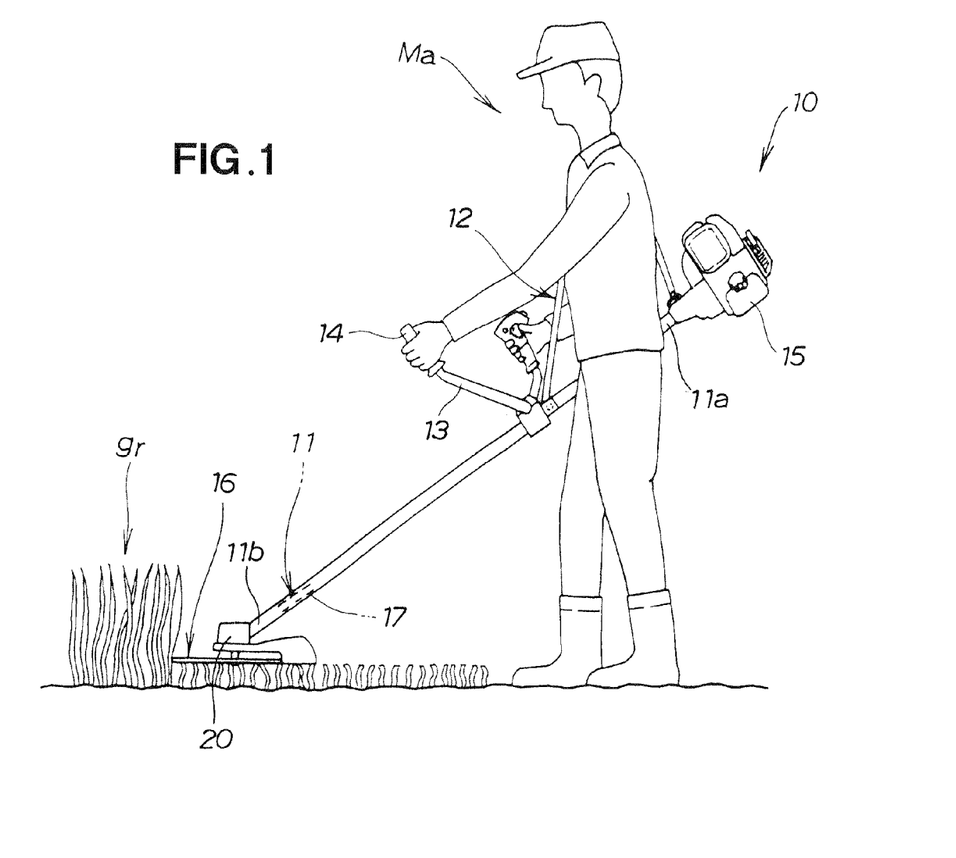
FIG. 1 is a view illustrating a bush cutter according to a first embodiment of the present invention and a manner of use of the bush cutter.

Reference is now made to FIG. 1 showing a bush cutter according to a first embodiment of the present invention and a mode of use of the bush cutter. As seen in FIG. 1, the bush cutter 10 is a shoulder-hanging type bush cutter that includes a shoulder-hanging belt 12 and a bar-shaped handle 13. A human operator Ma can sling the bush cutter 10 over its shoulder by placing the shoulder-hanging belt 12 on the shoulder. The human operator Ma can cut weeds gr by causing a cutter blade 16 to rotate by means of a drive source 15 while gripping a grip 14 of the handle 13 and swinging a pipe-shaped operating rod 11 back and forth and left and right.

The bush cutter 10 includes: the pipe-shaped operating rod 11; the drive source 15 provided on one end portion 11a of the operating rod 11; a drive shaft 17 rotatably passed through the operating rod 11; a transmission unit 20 provided on another end portion 11b of the operating rod 11; and a cutter blade 16 provided on the transmission unit 20. The drive source 15 comprises an engine for driving the drive shaft 17. Driving power produced by the drive source 15 is transmitted to the cutter blade 16 via the drive shaft 17 and transmission unit 20.

Figure 2:
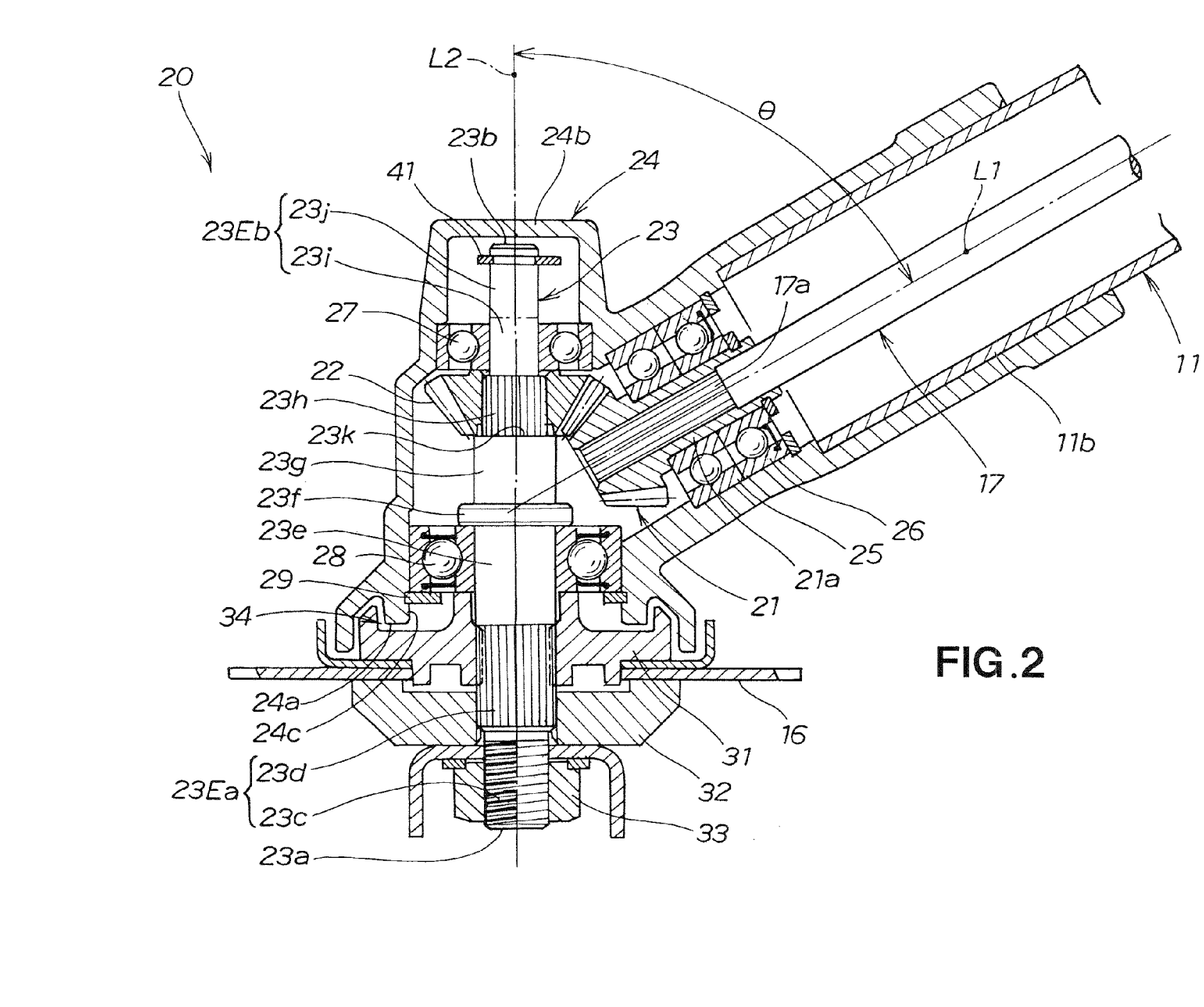
FIG. 2 is a sectional view showing a transmission unit and a cutter blade of FIG. 1 and other components provided around the transmission unit and cutter blade.

As shown in FIG. 2, the transmission unit 20 includes: a driving bevel gear 21 connected to an end portion 17a of the drive shaft 17; a driven bevel gear 22 meshing with the driving bevel gear 21; an output shaft 23 connected to the driven bevel gear 22; and a gearbox 24 fixedly attached to the other end portion 11b of the operating rod 11.

The gearbox 24 is a bottomed case that opens at one end (open end) portion 24a facing the cutter blade 16, and it accommodates therein the end portion 17a of the drive shaft 17, driving and driven bevel gears 21 and 22 and most part of the output shaft 23. The driven bevel gear 22 and output shaft 23 are built into the gearbox 24 through the open end portion 24a. Preferably, the gearbox 24 is a die-cast component part of a light alloy, such as an aluminum alloy, in order to reduce the weight of the bush cutter 10.

When the human operator Ma is performing bush cutting work in a standing posture using the bush cutter 10 as shown in FIG. 1, the output shaft 23 extends generally vertically. To achieve an enhanced operability in this state, an axial angle θ between the driving bevel gear 21 and the driven bevel gear 22 is set at an obtuse angle of about 60°. The axial angle θ is a minimum angle between the axis L1 of the driving bevel gear 21 (i.e., axial centerline L1 of the drive shaft 17) and the axis L2 of the driven bevel gear 22 (i.e., axial centerline L2 of the output shaft 23) necessary for achieving operative cooperation between the driving bevel gear 21 and the driven bevel gear 22.

The driving bevel gear 21 has a boss 21a connected to the drive shaft 17 in such a manner that the boss 21a is not rotatable relative to the drive shaft 17. The boss 21a is rotatably supported by the gearbox 24 via bearings 25 and 26, and the drive shaft 17 is not axially movable relative to the gearbox 24. The bearings 25 and 26 are in the form of rolling bearings, such as ball bearings. The driving bevel gear 21 press-fit in the bearings 25 and 26 in advance is built into the gearbox 24 through the other end portion 11b of the operating rod 11.

Figure 3:
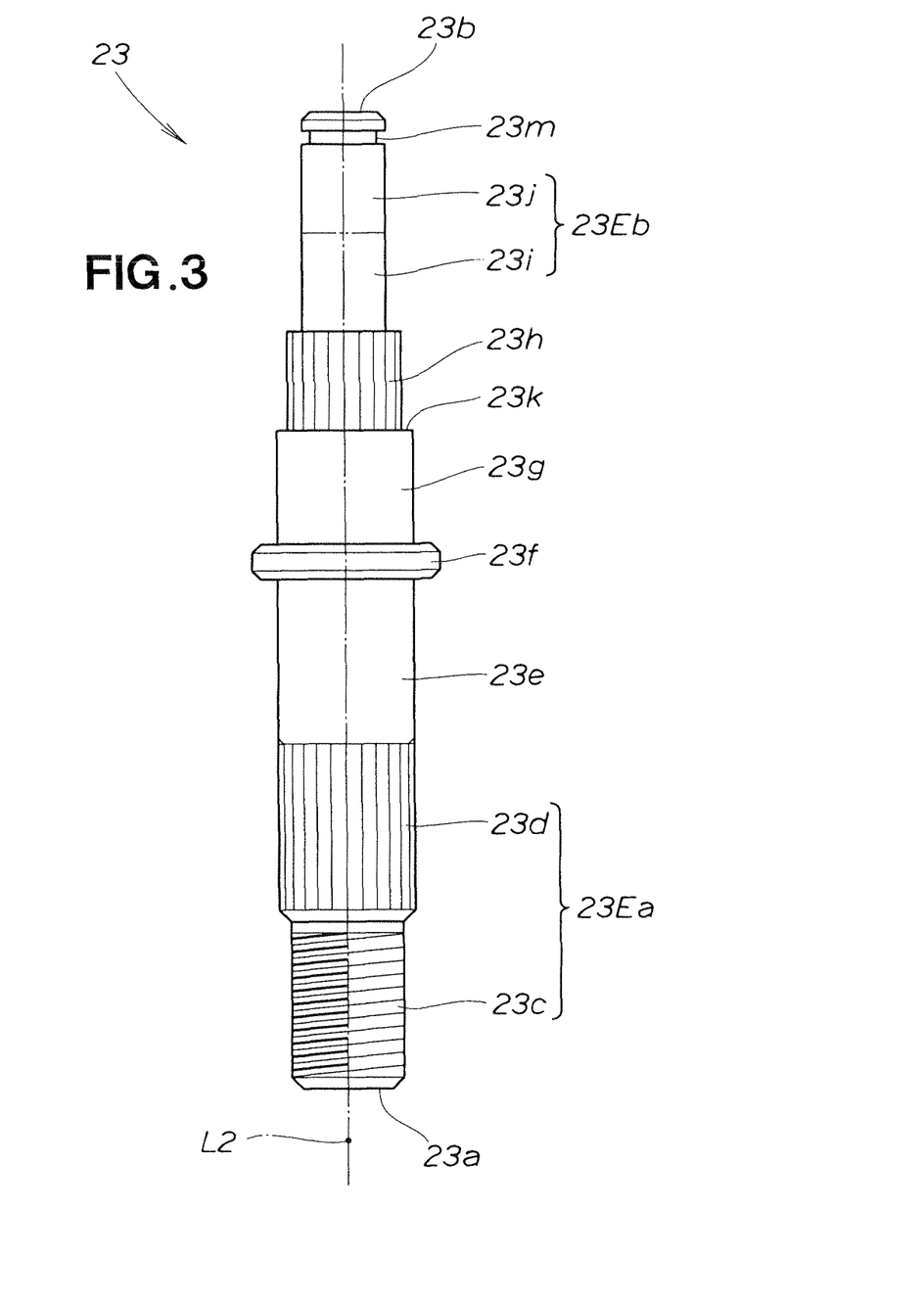
FIG. 3 is a side view of an output shaft shown in FIG. 2.

As shown in FIGS. 2 and 3, the output shaft 23 is a rotation shaft that integrally has, from one axial end surface 23a to the other axial end surface 23b, an external (or male) thread portion 23c, a cutter blade attachment portion 23d, a second supported portion 23e, a positioning increased-diameter portion 23f, a spacing portion 23g, a gear attachment portion 23h, a first supported portion 23i and an extension portion 23j.

The above-mentioned external thread portion 23c and the cutter blade attachment portion 23d constitute one end section 23Ea of the output shaft 23 which has the cutter blade 16 provided thereon. The first supported portion 23i and the extension portion 23j constitute another end section 23Eb which does not have the cutter blade 16 provided thereon.

The cutter blade attachment portion 23d projects downwardly outwardly of the open end portion 24a of the gearbox 24, for attachment thereto of the cutter blade 16. The second supported portion 23e is located adjacent to the cutter blade attachment portion 23d and closer to the other end surface 23b than the cutter blade attachment portion 23d. The positioning increased-diameter portion 23f is located adjacent to the second supported portion 23e and closer to the other end surface 23b than the second supported portion 23e, and it has a greater diameter than the second supported portion 23e and spacing portion 23g. The spacing portion 23g is located adjacent to the positioning increased-diameter portion 23f and closer to the other end surface 23b than the positioning increased-diameter portion 23f, and it is intended to secure a predetermined distance between the second supported portion 23e and the gear attachment portion 23h. The gear attachment portion 23h is located adjacent to the spacing portion 23g and closer to the other end surface 23b than the spacing portion 23g, for attachment thereto of the driven bevel gear 22. The gear attachment portion 23h has a smaller diameter than the spacing portion 23g, and thus, a shoulder surface 23k is defined between the spacing portion 23g and the gear attachment portion 23h. The first supported portion 23i is located adjacent to the gear attachment portion 23h and closer to the other end surface 23b than the gear attachment portion 23h. The first supported portion 23i is an extension of the first supported portion 23i which extends up to the other end surface 23b, and it has an annular fitting groove 23m formed in and along its outer peripheral surface near the other end surface 23b.

The other end surface 23b of the output shaft 23 is located within the gearbox 24 near a bottom portion 24b of the gearbox 24 opposite from the open end 24a. The output shaft 23 is rotatably supported in the gearbox 24 via first and second (or upper and lower) bearings 27 and 28 that are each in the form of a rolling bearing, such as a ball bearing, fixed to the inner surface of the gearbox 24.

The first bearing 27 is located within the gearbox 24 and closer to the other end surface 23b of the output shaft 23 than the driving bevel gear 21, and it supports the first supported portion 23i (other end section 23Eb). The first bearing 27 is provided so as not to be axially movable relative to the output shaft 23 in a direction away from or opposite from the open end portion 24a.

The driven bevel gear 22 is coupled to the gear attachment portion 23h of the output shaft 23 through spline engagement (i.e., fitting engagement between female and male spline elements) against relative rotation to the output shaft 23. Namely, the driven bevel gear 22 is spline-coupled to the output shaft 23 against relative rotation to the output shaft 23. Further, the driven bevel gear 22 is axially sandwiched between the shoulder surface k and an inner race of the first bearing 27 and meshingly engages with the driving bevel gear 21 from immediately under the first bearing 27. Thus, the driven bevel gear 22 is prevented by the driving bevel gear 21 from axially moving toward the one end surface 23a of the output shaft 23 and prevented by the first bearing 27 from moving toward the other end surface 23b of the output shaft 23. Namely, the driven bevel gear 22 is accommodated within the gearbox 24 against movement relative to the gearbox 24 in the axial direction of the output shaft 23. Because the driven bevel gear 22 is not axially movable toward the one end surface 23a of the output shaft 23 as noted above, the first bearing 27 too is not axially movable toward the one end surface 23a of the output shaft 23.

The second bearing 28 is located near the open end portion 24a within the gearbox 24 and supports the second supported portion 23e located adjacent to the cutter blade attachment portion 23d having the cutter blade 16 attached thereto. The second bearing 28 is engaged (or retained) by an engaging member 29 against axial movement toward the open end portion 24a, i.e. toward the cutter blade 16. The engaging member 29 is, for example, in the form of a retaining ring. This retaining ring 29 is fastened to the inner surface of the gearbox 24 by being fitted in an annular groove formed in and along the inner surface 24c of the gearbox 24 to thereby lock an outer race of the second bearing 28 at a predetermined position within the gearbox 24.

The cutter blade 16 is a disk-shaped blade attached to the cutter blade attachment portion 23d by being sandwiched between a pair of first and second sandwiching members 31 and 32, of which the first sandwiching member 31 is located on a side of the cutter blade 16 located closer to the interior of the gearbox 24 and the second sandwiching member 32 is located on a side of the cutter blade 16 opposite from the first sandwiching member 31. These sandwiching members 31 and 32 are spline-coupled to the cutter blade attachment portion 23d with the cutter blade 16 axially sandwiched therebetween. Thus, the cutter blade 16 and the first and second sandwiching members 31 and 32 are prevented from relative rotation to each other, but are axially movable relative to each other.

Further, the cutter blade 16, sandwiching members 31 and 32 and inner race of the second bearing 28 are sandwiched between the positioning increased-diameter portion 23f and a nut 33 screwed onto the external thread portion 23c, as a result of which the cutter blade 16 is attached to the output shaft 23 in an appropriately positioned manner. Thus, the cutter blade 16 and the second bearing 28 are prevented from axial movement relative to the output shaft 23.

As clear from the foregoing, the output shaft 23 is not only prevented by the second bearing 28 and engaging member 29 from axial movement in a direction toward the one end surface 23a, but also prevented by the driven bevel gear 22 and first bearing 27 from axial movement in a direction toward the other end surface 23b. Namely, the output shaft 23 is prevented from axial movement relative to the gearbox 24.

As further shown in FIG. 2, the first sandwiching member 31 is located adjacent to the open end portion 24a of the gearbox 24. A labyrinth mechanism 34 is provided between the lower surface of the open end portion 24a and the upper surface of the first sandwiching member 31. The labyrinth mechanism 34 is in the form of a maze-like narrow gap, which prevents foreign matters, such as cut grass and pebbles, from entering the gearbox 24 during bush cutting work using the bush cutter 10.

As also shown in FIG. 2, the other end section 23Eb of the output shaft 23 projects beyond the first bearing 27 in a direction away from or opposite from the cutter blade 16, and a retaining stopper 41 is provided on a projecting distal end portion of the other end section 23Eb, i.e. on the extension portion 23j. In the instant embodiment, the retaining stopper 41 is in the form of a retaining ring provided within the gearbox 24, and this retaining ring 41 is provided on the extension portion 23j by being fitted in the fitting groove 23m formed in the extension portion 23j (see FIG. 4).

Figure 4:
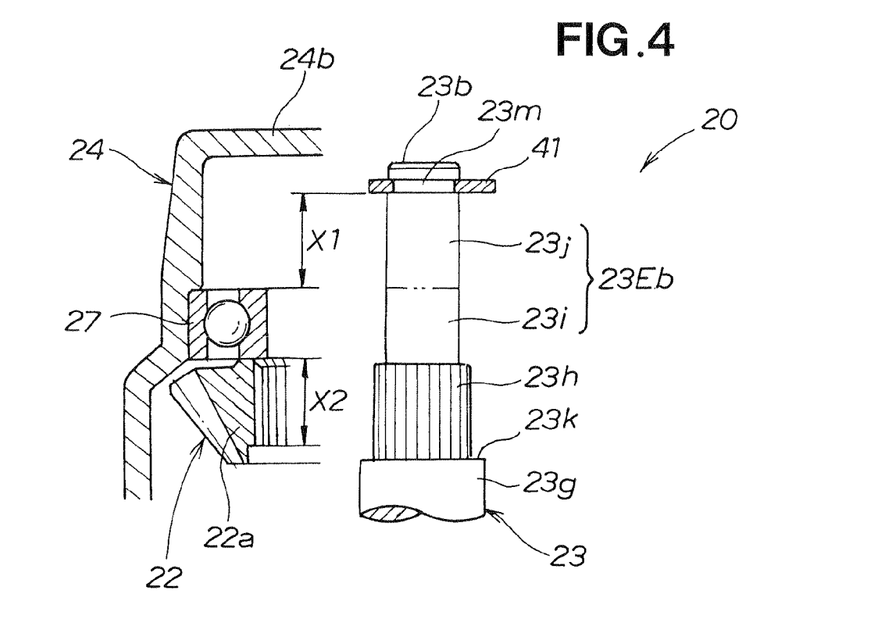
FIG. 4 is a sectional view explanatory of relationships among the output shaft, driven bevel gear and first bearing.
Figure 5:
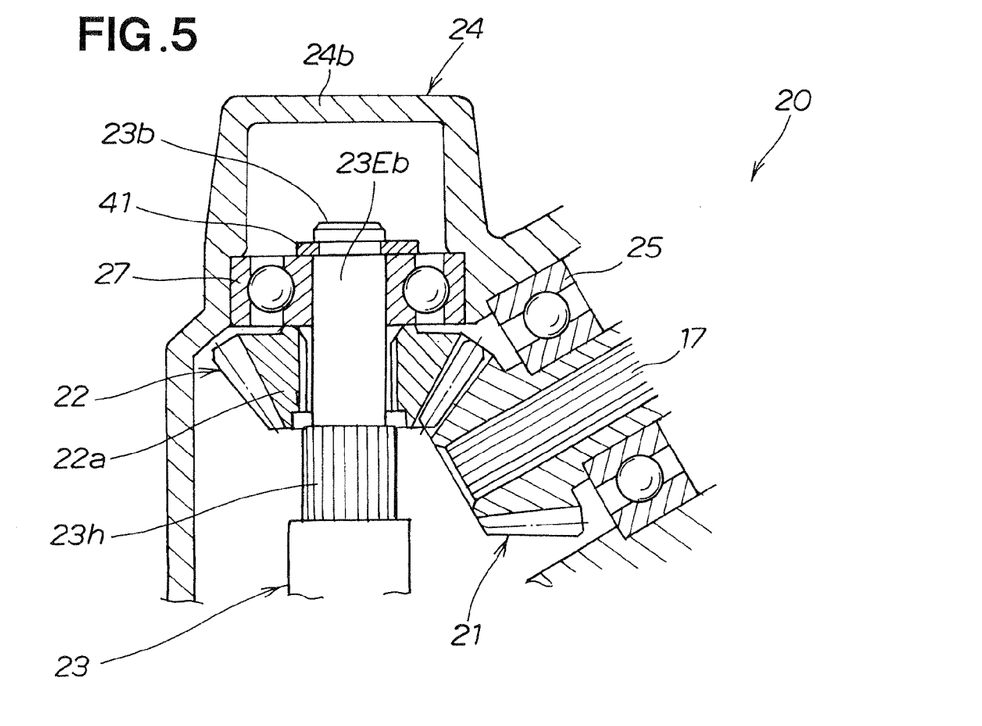
FIG. 5 is a sectional view explanatory of behavior of the output shaft, driven bevel gear and first bearing.

As shown in FIGS. 2 and 4, with the output shaft 23 duly mounted in the gearbox 24, the lower end surface of the retaining ring 41 is spaced, in a direction toward the other end surface 23b, from the upper end surface of the inner race of the first bearing 27 by a predetermined distance X1 (hereinafter "spaced distance X1"). The driven bevel gear 22 has a boss 22a having a length X2; the length (spline coupling length) X2 represents an axial length over which the boss 22a is spline-coupled to the gear attachment portion 23h. In the instant embodiment, the spaced distance X1 is set greater than the length X2 of the boss 22a (i.e., X1>X2). The length X2 will hereinafter be referred to also as "spline coupling length X2".

The following describe behavior of the transmission unit 20. As shown in FIG. 2, the driving power generated by the drive source 15 (FIG. 1) is transmitted to the cutter blade 16 by way of the drive shaft 17, driving bevel gear 21, driven bevel gear 22, spline-coupled portion between the driven bevel gear 22 and the gear attachment portion 23h, output shaft 23 and first and second sandwiching members 31 and 32.

As the bush cutter 10 is used for a long time, the open end portion 24a of the gearbox 24 may become worn due to biting, into the labyrinth mechanism 34, of foreign matters and winding, around the open end portion 24a, of foreign matters. If the wear of the open end portion 24a of the gearbox 24 continues to progress for a long time, the retaining ring 29 retaining the second bearing 28 adjacent to the cutter blade 16 would be undesirably detached downward from the gearbox 24. When the second bearing 28 has become no longer engaged by the retaining ring 29 like this, the second bearing 28 and the output shaft 23 may move axially relative to the gearbox 24 in the direction toward the cutter blade 16. On the other hand, the first bearing 27 and the driven bevel gear 22 would not move in the axial direction of the output shaft 23.

As the output shaft 23 moves toward the cutter blade 16 by a predetermined length equal to the spaced distance X1 shown in FIG. 4, the retaining ring 41 (retaining stopper 41) moves with the output shaft 23 until it contacts the upper end of the inner race of the first bearing 27, so that the output shaft 23 is locked in the gearbox 24. Namely, the retaining ring 41 allows the output shaft 23 to move toward the cutter blade 16 by the spaced distance 41.

As explained above in relation to FIG. 4, the spaced distance X1 is set greater than the length (spline coupling length) X2 of the boss 22a of the driven bevel gear 22. When the retaining string 41 has contacted the first bearing 27 in response to the output shaft 23 axially moving by the distance X1, the output shaft 23 is brought out of the spline-coupling with the driven bevel gear 22, so that the output shaft 23 becomes rotatable relative to the driven bevel gear 22.

Namely, the retaining ring 41 allows the output shaft 23 to move toward the cutter blade 16 until the output shaft 23 becomes rotatable relative to the driven bevel gear 22 as the second bearing 28 is disengaged from, i.e. released from the engagement by, the engaging member 29. Also, the retaining ring 41 prevents the output shaft 23 from further moving relative to the gearbox 24 toward the cutter blade 16 beyond the spaced distance X1. Therefore, the output shaft 23 can be prevented from being detached from the gearbox 24. In this state, the driven bevel gear 22 meshing with the driving bevel gear 21 only rotates idly and thus does not transmit the driving power to the output shaft 23, so that the cutter blade 16 will promptly stop rotating due to resistance of grass etc. Thus, the human operator can promptly recognize that the cutter blade 16 has stopped rotating, as a result of which maintenance and checkup of the bush cutter 10 can be performed timely and promptly.

Further, the instant embodiment can reliably prevent the output shaft 23 from moving toward the cutter blade 16 beyond the spaced distance X1, with the simple construction where the other end section 23Eb of the output shaft 23 projects beyond the first bearing 27 in a direction opposite or away from the cutter blade 16 and the retaining stopper 41 is provided on the distal end portion of the other end section 23 23Eb, i.e. on the extension portion 23j.

Figure 6:
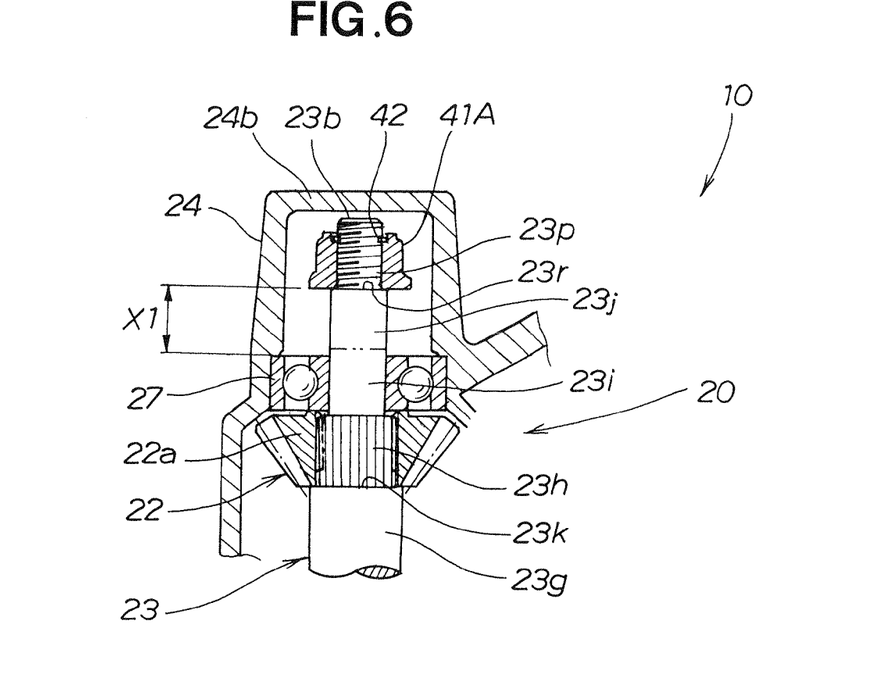
FIG. 6 is a sectional view of a second embodiment of the bush cutter of the present invention, which particularly shows the gearbox and other components provided around the gearbox in the second embodiment.

Next, with reference to FIG. 6, a description will be given about a second embodiment of the bush cutter 10 of the present invention. The second embodiment of the bush cutter 10 is characterized in that the retaining stopper 41A is in the form of a nut. Namely, this nut 41A is provided on the extension portion 23j of the output shaft 23 in place of the retaining ring 41 of FIG. 4 provided in the first embodiment. A male or external thread portion 23p for screwing thereon the nut 41A is formed on and along an outer peripheral surface portion of the output shaft 23 near the other end surface 23b. The external thread portion 23p has a smaller outer diameter than the extension portion 23j, and thus, a shoulder surface 23r is defined between the extension portion 233 and the external thread portion 23p. The nut 41A is screwed onto the external thread portion 23p to the position of the shoulder surface 23r, and then a lock member 42, such as a retaining ring, is inserted to prevent rotation of the nut 41 relative to the external thread portion 23p.

The lower end surface of the nut 41A, i.e. the shoulder surface 23r, is spaced, in the direction toward the other end surface 23b, from the upper end surface of the first bearing 27 by a predetermined distance X1 (hereinafter "spaced distance X1"). The spaced distance X1 provided in this embodiment is equal to the spaced distance X1 in the first embodiment shown in FIG. 4. The retaining stopper 41A provided in the second embodiment operates in the same manner as the retaining stopper 41 provided in the first embodiment and achieves the same advantageous benefits as the retaining stopper 41. The other elements in the second embodiment of the bush cutter 10 are identical in construction to those in the first embodiment of the bush cutter 10 and thus will not be described here to avoid unnecessary duplication.

Figure 7:
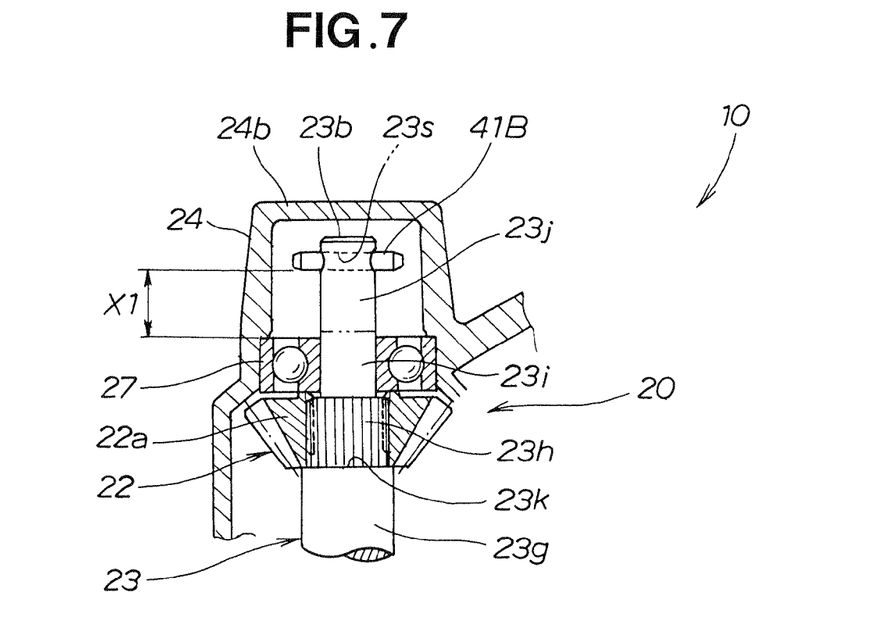
FIG. 7 is a sectional view of a third embodiment of the bush cutter of the present invention, which particularly shows the gearbox and other components around the gearbox in the third embodiment.

Next, with reference to FIG. 7, a description will be given about a third embodiment of the bush cutter 10 of the present invention. The third embodiment of the bush cutter 10 is characterized in that the retaining stopper 41B is a pin. Namely, this pin 41B is provided on the extension portion 23j of the output shaft 23 in place of the retaining ring 41 of FIG. 4 provided in the first embodiment. A pin hole 23s for fitting therein the retaining pin 41B is a through-hole formed through a portion of the output shaft 23 near the other end surface 23b to extend in a direction intersecting the axis of the output shaft 23. The pin 41B has a length greater than the diameter of the extension portion 23j and is provided on the extension portion 23j by being press-fit in the pin hole 23s.

The lower end surface of the pin 41B provided on the extension portion 23j is spaced, in the direction toward the other end surface 23b, from the upper end surface of the inner race of the first bearing 27 by a predetermined distance X1 (hereinafter "spaced distance X1"). The spaced distance X1 in the instant embodiment is equal to the spaced distance X1 in the first embodiment shown in FIG. 4. The retaining stopper 41B provided in the third embodiment operates in the same manner as the retaining stopper 41 provided in the first embodiment and achieves the same advantageous benefits as the retaining stopper 41. The other elements in the third embodiment of the bush cutter 10 are identical in construction to those in the first embodiment of the bush cutter 10 and thus will not be described here to avoid unnecessary duplication.

It should be appreciated that the bush cutter 10 of the present invention is not limited to the shoulder-hanging type and may be, for example, the backpack type which the human operator Ma carries on its back.

Further, the retaining stopper 41, 41A, 41B may be constructed in any desired manner as long as it can lock the output shaft 23 in the gearbox 24 so that the output shaft 23 having moved the predetermined amount X1 toward the cutter blade

16 is prevented from moving any longer toward the cutter blade 16. Namely, the retaining stopper 41, 41A, 41B is not limited to the aforementioned construction where it locks the output shaft 23 within the gearbox 24 by contacting the first bearing 27. For example, the retaining stopper 41, 41A, 41B may be constructed to directly contact an interior portion, such as the inner surface 24c, of the gearbox 24.

The basic principles of the present invention are well suited for application to bush cutters of the shoulder-hanging type and backpack type.

What is claimed is:

1. A bush cutter in which driving power of a drive source is transmitted from a drive shaft to an output shaft, via driving and driven bevel gears, to rotate a cutter blade provided on one end section of the output shaft, the bush cutter comprising:

a gearbox supporting therein the output shaft via first and second bearings, the driven bevel gear being accommodated in the gearbox in such a manner that the driven bevel gear is not movable relative to the gearbox in an axial direction of the output shaft;

the second bearing engaged by an engaging member, fastened to the gearbox, in such a manner that the second bearing is not axially movable toward the cutter blade relative to the gearbox, the second bearing supporting a portion of the output shaft located near the cutter blade;

the output shaft connected to the driven bevel gear within the gearbox in such a manner that the output shaft is not rotatable relative to the driven bevel gear but axially movable relative to the driven bevel gear, and that, when an engaged state of the second bearing is canceled by the engaging member, a gear attachment portion of the output shaft is axially movable with the second bearing toward the cutter blade; and a retaining stopper provided within the gearbox, wherein, when the engaged state of the second bearing is canceled by the engaging member, the gear attachment portion of the output shaft is allowed to axially move toward the cutter blade until the output shaft becomes rotatable relative to the driven bevel gear, the retaining stopper preventing the gear attachment portion of the output shaft from further axially moving toward the cutter blade after the output shaft becomes rotatable relative to the driven bevel gear.

2. The bush cutter of claim 1, wherein the first bearing is not movable relative to the gearbox in the axial direction and supports a second end section of the output shaft opposite from the one end section having the cutter blade provided thereon, the other end section of the output shaft axially projects beyond the first bearing in a direction opposite from the cutter blade, the retaining stopper being provided on a projecting distal end portion of the second end section, and rotation of the output shaft relative to the driven bevel gear is allowed when the retaining stopper is brought into contact with the first bearing in response to the gear attachment portion of the output shaft axially moving toward the cutter blade.

3. The bush cutter of claim 2, wherein the driven bevel gear is spline-coupled to the output shaft, and a distance between a lower end surface of the retaining stopper and an upper end surface of the first bearing is greater than an axial length over which the driven bevel gear is spline-coupled to the output shaft.

* * * * *